US006615366B1

(12) United States Patent
Grochowski et al.

(10) Patent No.: US 6,615,366 B1
(45) Date of Patent: Sep. 2, 2003

(54) MICROPROCESSOR WITH DUAL EXECUTION CORE OPERABLE IN HIGH RELIABILITY MODE

(75) Inventors: Edward T. Grochowski, San Jose, CA (US); William Rash, Saratoga, CA (US); Nhon Quach, San Jose, CA (US); Hang Nguyen, Tempe, AZ (US); Andres Rabago, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,096

(22) Filed: Dec. 21, 1999

(51) Int. Cl.[7] .................................................. G06F 11/00
(52) U.S. Cl. ................................. 714/10; 712/1; 712/43
(58) Field of Search ........................... 714/11, 43, 12, 714/17, 10; 712/229, 20, 43; 700/4, 5

(56) References Cited

U.S. PATENT DOCUMENTS

| 4,912,707 A | * | 3/1990 | Kogge et al. ................ 712/228 |
| 5,475,856 A | * | 12/1995 | Kogge ........................... 700/12 |
| 5,504,859 A | * | 4/1996 | Gustafson et al. ............. 714/11 |
| 5,535,410 A | * | 7/1996 | Watanabe et al. ............ 345/505 |
| 5,604,753 A | * | 2/1997 | Bauer et al. ................... 714/17 |
| 5,630,047 A | * | 5/1997 | Wang ............................ 714/15 |
| 5,659,721 A | * | 8/1997 | Shen et al. .................. 712/228 |
| 5,664,214 A | * | 9/1997 | Taylor et al. ................. 712/20 |
| 5,748,873 A | * | 5/1998 | Ohguro et al. ................ 714/10 |
| 5,966,544 A | * | 10/1999 | Sager ............................ 712/1 |

OTHER PUBLICATIONS

Keith Diefendorff, Microprocessor Report, Nov. 15, 1999, pp. 8, vol. 13, No. 15.
Keith Diefendorff, Power4 Focuses on Memory Bandwidth, Oct. 6, 1999, pp. 11–17.

* cited by examiner

*Primary Examiner*—Robert Beausoliel
*Assistant Examiner*—Christopher McCarthy
(74) *Attorney, Agent, or Firm*—Blakely, Sokoloff, Taylor & Zafman LLP

(57) ABSTRACT

A processor is provided having dual execution cores that may be switched between high reliability and high performance execution modes dynamically, according to the type of code segment to be executed. When the processor is in high performance mode, the dual execution cores operate in lock step on identical instructions, and the execution results generated by each execution core are compared to detect any errors. In high performance monde, the dual execution cores operate independently.

24 Claims, 10 Drawing Sheets

MICROPROCESSOR WITH DUAL EXECUTION CORE OPERABLE IN HIGH RELIABILITY MODE

BACKGROUND OF THE INVENTION

1. Technical Field

The present invention relates to microprocessors and, in particular, to microprocessors capable of operating in high-reliability modes.

2. Background Art

Soft errors arise when alpha particles or cosmic rays strike an integrated circuit and alter the charges stored on the voltage nodes of the circuit. If the charge alteration is sufficiently large, a voltage representing one logic state may be changed to a voltage representing a different logic state. For example, a voltage representing a logic true state may be altered to a voltage representing a logic false state, and any data that incorporates the logic state will be corrupted.

Soft error rates (SERs) for integrated circuits, such as microprocessors ("processors"), increase as semiconductor process technologies scale to smaller dimensions and lower operating voltages. Smaller process dimensions allow greater device densities to be achieved on the processor die. This increases the likelihood that an alpha particle or cosmic ray will strike one of the processor's voltage nodes. Lower operating voltages mean that smaller charge disruptions are sufficient to alter the logic state represented by the node voltages. Both trends point to higher SERs in the future.

Soft errors may be corrected in a processor if they are detected before any corrupted results are used to update the processor's architectural state. Processors frequently employ parity-based mechanisms to detect data corruption due to soft errors. A parity bit is associated with each block of data when it is stored. The bit is set to one or zero according to whether there is an odd or even number of ones in the data block. When the data block is read out of its storage location, the number of ones in the block is compared with the parity bit. A discrepancy between the values indicates that the data block has been corrupted. Agreement between the values indicates that either no corruption has occurred or two (or four . . . ) bits have been altered. Since the latter events have very low probabilities of occurrence, parity provides a reliable indication of whether data corruption has occurred. Error correcting codes (ECCs) are parity-based mechanisms that track additional information for each data block. The additional information allows the corrupted bit(s) to be identified and corrected.

Parity/ECC mechanisms have been applied extensively to caches, memories, and similar data storage arrays. These structures have relatively high densities of data storing nodes and are susceptible to soft errors even at current device dimensions. Their localized array structures make it relatively easy to implement parity/ECC mechanisms. The remaining circuitry on a processor includes data paths, control logic, execution logic and registers ("execution core"). The varied structures of these circuits and their distribution over the processor die make it more difficult to apply parity/ECC mechanisms.

One approach to detecting soft errors in an execution core is to process instructions on duplicate execution cores and compare results determined by each on an instruction by instruction basis ("redundant execution"). For example, one computer system includes two separate processors that may be booted to run in either a symmetric multi-processing ("SMP") mode or a Functional Redundant Check unit ("FRC") mode. In SMP mode, instruction execution is distributed between the processors to provide higher overall performance than single processor systems. In FRC mode, the processors execute identical code segments and compare their results on an instruction by instruction basis to determine whether an error has occurred. The operating mode can only be switched between SMP and FRC modes by resetting the computer system.

The dual processor approach is costly (in terms of silicon) In addition, the inter-processor signaling through which results are compared is too slow to detect corrupted data before it updates the processors' architectural states. Consequently, this approach is not suitable for correcting detected soft errors.

Another computer system provides execution redundancy using dual execution cores on a single processor chip. This approach eliminates the need for inter-processor signaling, and detected soft errors can usually be corrected. However, the execution resources are dedicated to operate in FRC mode.

The present invention addresses these and other deficiencies of available high reliability computer systems.

SUMMARY OF THE INVENTION

The present invention provides a processor having dual execution cores that may be switched dynamically between operating in a high reliability mode and a high performance mode.

In accordance with the present invention, a processor comprises first and second execution cores. The execution cores process identical instructions in lock step, when the processor is operated in a high reliability mode. The execution cores may process different instructions when the processor is operated in a high performance mode. The processor may be switched dynamically between the high performance (HP) and high reliability (HR) modes.

For one embodiment of the invention, the processor is switched between HP and HR modes under software control. Each execution core enters a ready state when it executes an HP-to-HR mode switch instruction (S_HR), and the processor switches from HP to HR mode when both execution cores have entered the ready state.

For another embodiment of the invention, the processor includes a check unit that is activated in HR mode and deactivated in HP mode. The check unit compares the execution results generated by the first and second execution cores when it is activated, and signals an error when the execution results do not match. For yet another embodiment of the invention, the processor replays selected instructions when an error is signaled.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a flexible approach to mitigating the effects of soft errors in a processor. The processor's execution resources are dynamically adjusted to operate in a high reliability (HR) mode or a high performance (HP) mode, according to the type of code being handled. This approach recognizes that not all computer code is critical to the integrity of a computer system, even one that is designed to execute code with high reliability. For example, code associated with the operating system kernel and code that operates directly on the platform hardware is preferably executed in HR mode. Errors in processing either type of code can cause the entire computer system to crash, and such errors are to be avoided at all costs. For these critical code types, the hardware cost of implementing redundant execution is more than balanced by the elimination of system crashes that might otherwise occur.

Most computer code is significantly less likely to crash a computer system or threaten it's integrity in the event of data corruption. For example, an error in the color or location of a pixel or an error in the value of a database field does not threaten the integrity of a computer system. Redundant execution is a heavy-handed strategy for running these programs reliably. In particular, it consumes execution resources that could otherwise be used to speed the execution of program code.

The present invention supports flexible processing of computer code according to the nature of the code being processed. For one embodiment of the invention, a processor includes a pair of execution cores. In HR mode, the processor operates the execution cores in lock step on identical code segments and compares the results to identify errors. In HP mode, the execution cores process different code segments, significantly increasing the processor's instruction throughput. Mode switch instructions switch the processor between HP and HR modes. For an alternative embodiment, a hardware mechanism may switch the processor between modes when a mode condition is detected such as execution of code from a specified area of memory.

Figure 1:
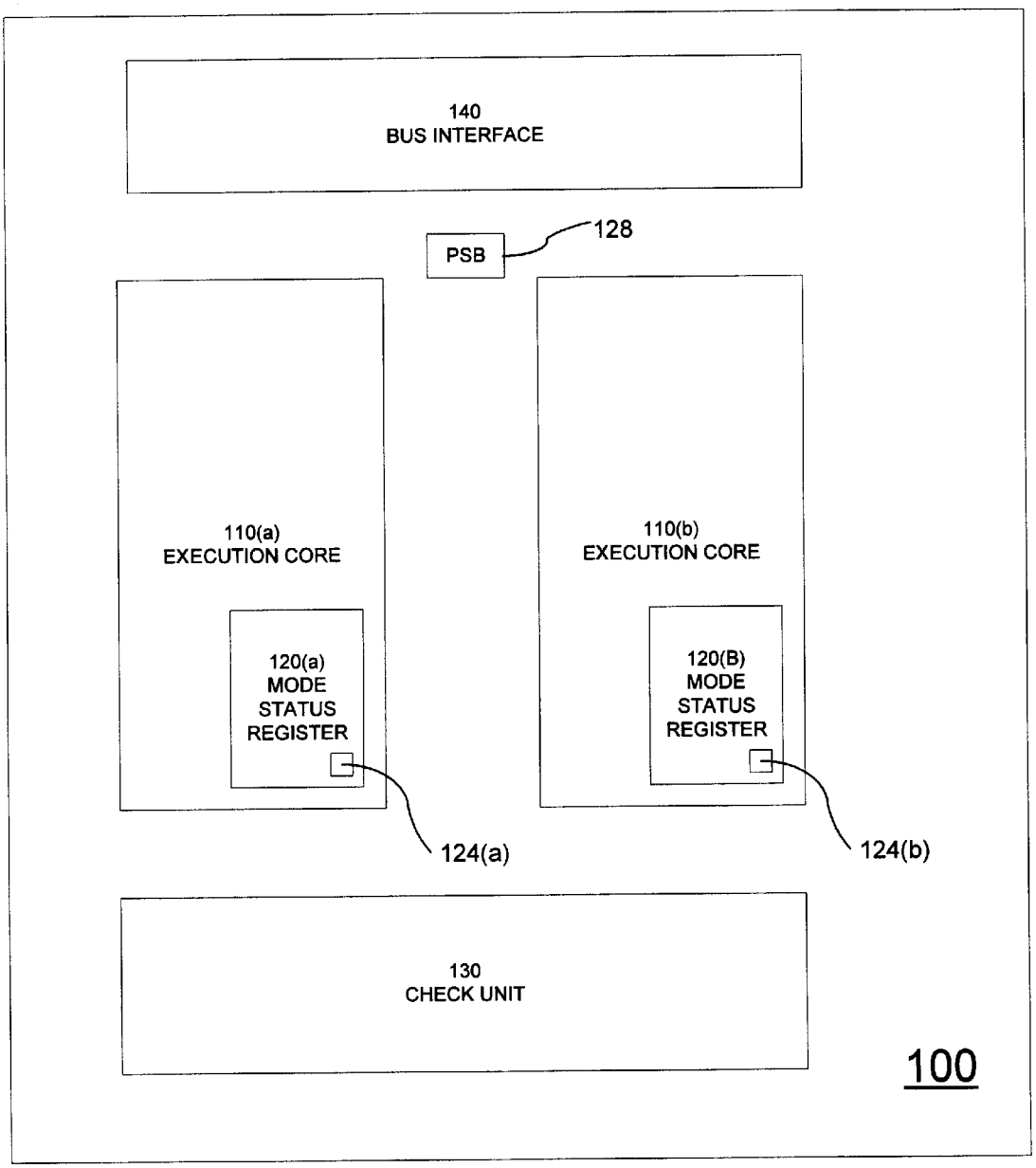
FIGS. 1 is a block diagram of one embodiment of a dual execution core processor in accordance with the present invention.

FIG. 1 is a block level diagram of one embodiment of a processor 100 in accordance with the present invention. Processor 100 includes a first execution core 110(a), a second execution core 110(b), corresponding core status registers (CSRs) 120(a), 120(b), and a check unit 130. Each CSR 120(a), 120(b) includes a core status bit (CSB) 124(a), 124(b), respectively. A bus. interface 140 to transfer data/ instructions to and from processor 100 is also shown. Each execution core 110(a), 110(b) includes resources to fetch, decode, execute, and retire instructions. In the following discussion, references to execution cores 110(a), 110(b) are not indexed unless the comments apply to a specific execution core 110. References to CSRs 120, CSBs 124, and any other resources that may be duplicated in execution cores 110 are treated similarly.

In HR mode, execution cores 110 operate as a redundant pair. That is each executes the same instructions from a code segment in lock step, and the results are compared by check unit 130, to detect errors in either execution core 110. In HP mode, execution cores 110 operate "independently". That is, each may execute different instructions from one or more code segments, effectively doubling the execution resources available for processing.

The level of independence between execution cores 110 in HP mode may vary in different embodiments of processor 100. For one embodiment, processor 100 may effectively operate as an SMP system implemented on a single processor chip when it is in HP mode. In this case, each execution core 110 operates as a separate processor, sharing only the processor die and certain components of a memory system. Another embodiment of processor 100 may support some level of coupling between execution cores 110 in HP mode by providing appropriate channels to share processor state information or execution core resources. In each case, switching between HR and HP modes may be accomplished under software control through mode switch instructions. The instructions may be provided through the different process threads being executed, an operating system (OS) scheduler, interrupt handlers, or the similar sources. Switching may also be accomplished in response to the detection of a mode switch condition.

This disclosure focuses on dual execution core processors that exhibit, at best, limited coupling between the execution cores. U.S. patent application Ser. No. 09/470,098, entitled "A Microprocessor Having a High Reliability Mode" and filed on even date herewith, describes a processor in which a single execution core includes clustered execution resources that may be switched between split (HP) and redundant (HR) mode operations.

For one embodiment of the invention, CSBs 124(a) and 124(b) indicate the states of execution cores 110(a) and 110(b), respectively, and CSBs 124(a) and 124(b) together indicate the mode in which processor 100 operates. The execution mode of the processor as a whole may be tracked through a single processor status bit (PSB) 128, indicated by the [dashed] box 128 in FIG. 1. For one embodiment, CSB 124 is set to a first value, e.g. one, when processor 100 is to be operated in HR mode, and it is set to a second value, e.g. zero, when processor 100 is to be operated in HP mode. CSB 124 is adjusted when a mode switch instruction triggers a switch between HR and HP modes or a mode switch condition is detected. Various resources in processor 100 alter their operations according to its execution mode. For example, instruction fetching, instruction retirement, and result checking are handled differently in HR and HP modes, and the corresponding resources adjust their operations according to the states of CSBs 124 (or PSB 128).

Figure 2A:
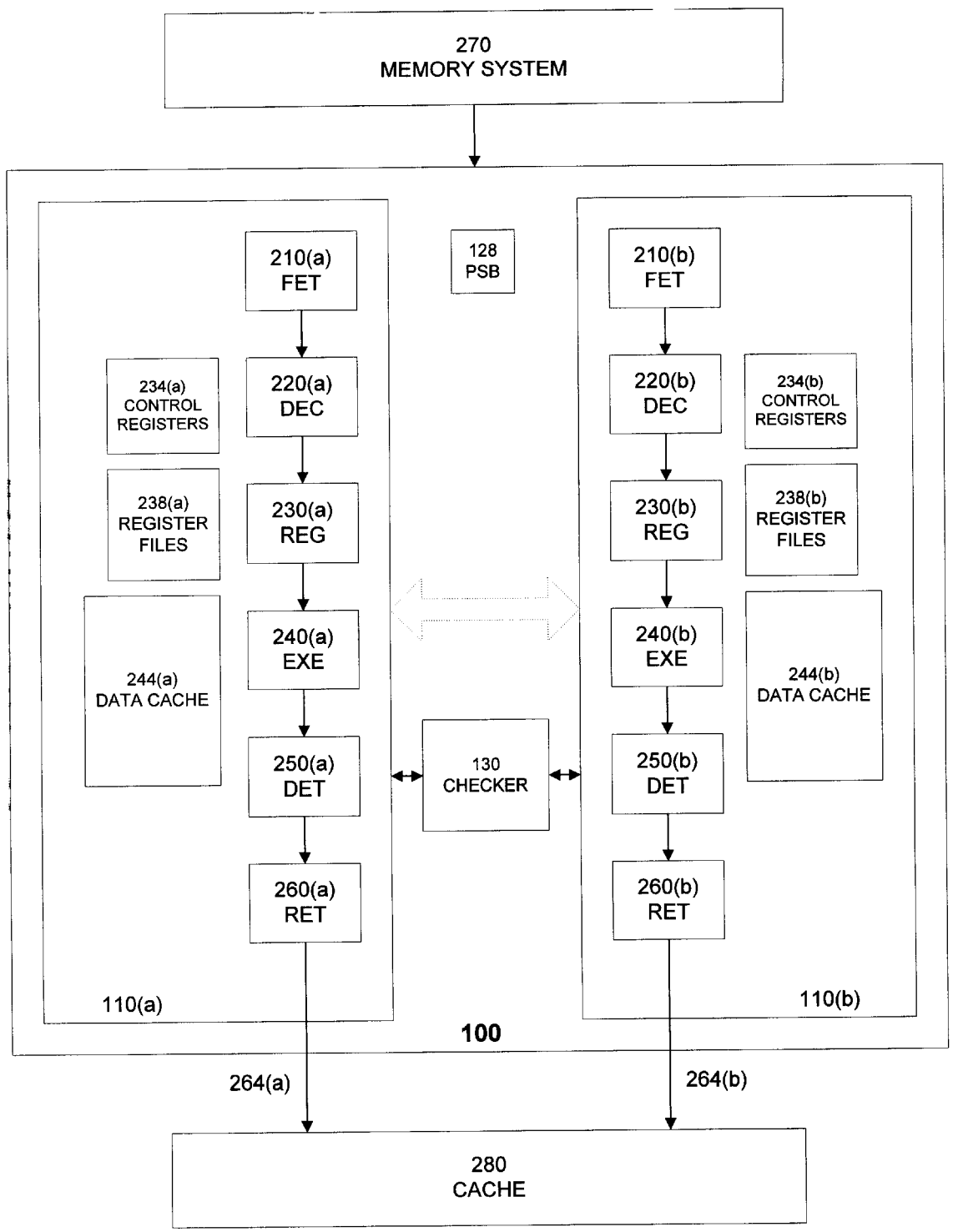
FIG. 2A is a more detailed block diagram of one embodiment of the dual execution core processor in FIG. 1.

FIG. 2A represents in greater detail one embodiment of processor 100. For the disclosed embodiment, each execution core 110 is represented as a series of stages in an instruction execution pipeline. Each stage corresponds to one or more operations implemented by execution cores 110 to execute their instructions. Alternatively, the pipeline stages may be understood to represent the logic that executes the indicated operations. Instructions and data are provided to execution cores 110 from a memory system 270. Cache 280 represents a portion of memory system 270 to which results from executed instructions are written. Cache 280 may be located on the same chip as processor 100 or it may be located on a separate chip.

For the disclosed embodiment of processor 100, each execution core 110 is partitioned into a fetch (FET) stage 210, a decode (DEC) stage 220, a register (REG) stage 230, an execute (EXE) stage 240, a detect (DET) stage 250, and a retirement (RET) stage 260. One or more instructions are retrieved from memory system 270 in FET stage 210. The retrieved instructions are decoded into μops in DEC stage 220, and source operands specified by the μop(s) are retrieved in REG stage 230. The μop(s) are executed on the retrieved operands in EXE stage 240, and any exceptions raised by the μop(s) are signaled in DET stage 250. The μop(s) is retired in RET stage 260 if no exceptions are detected. For the disclosed embodiment, results from retired μop(s) are written to cache 280 through retirement channel 264.

Embodiments of processor 100 may include a buffer to decouple front-end stage(s) (FET or FET and DEC) from back-end stages (DEC, REG, EXE, DET, and RET or REG, EXE, DET, and RET). The buffer temporarily stores fetched (or fetched and decoded) instructions. This allows front-end operations to continue, even if back-end operations are stalled or otherwise delayed. It also allows back-end operations to proceed if front-end operations are delayed. Embodiments of processor 100 may also employ a decoupling buffer to correct errors detected in HR mode.

The present invention does not require partition of processor 100 into a particular set of pipeline stages. For example, a disclosed stage may be subdivided into two or more stages to address timing issues or facilitate higher processor clock speeds. Alternatively, two or more stages may be combined into a single stage. Other embodiments may or may not employ a decoupling buffer. Still other embodiments may include hardware for processing instructions out-of-order. The disclosed pipeline provides only one example of how operations may be partitioned in a processor implementing the present invention.

Also shown for each execution core 110 are status/control (S/C) registers 234, data registers 238, and a data cache 244. S/C registers 234 store information that governs the operation of execution core 110. For example, S/C registers 234 typically include CSR 120 (and CSB 124). Data registers 238 store operands for use by various resources in execution core 110, and data cache 244 buffers operands between memory system 270 and other resources in execution core 110. Depending on timing constraints, data cache 244 may provide operands to data registers 238 or directly to execution resources in EXE stage 240.

Execution cores 110(a) and 110(b) are synchronized to operate on identical instructions in lock step when processor 100 is in HR mode. In HP mode, execution cores 110(a) and 110(b) operate on different instructions. As noted above, various embodiments of processor 100 may support different levels of coordination between execution cores 110(a) and 110(b) in HP mode, as indicated by the dashed arrow in FIG. 2A. For example, if processor 100 operates as a single chip SMP system in HP mode, the need for coordination between execution cores 110(a) and 110(b) arises mainly during mode switches. For other embodiments of processor 100, execution cores 110(a) and 110(b) may handle processes that are closely coupled. These embodiments support some sharing of data between S/C registers 234(a) and 234(b), data registers 238(a) and 238(b), and data caches 244(a) and 244(b), as well as some coordination of operations between the different pipe stages.

Figure 2B:
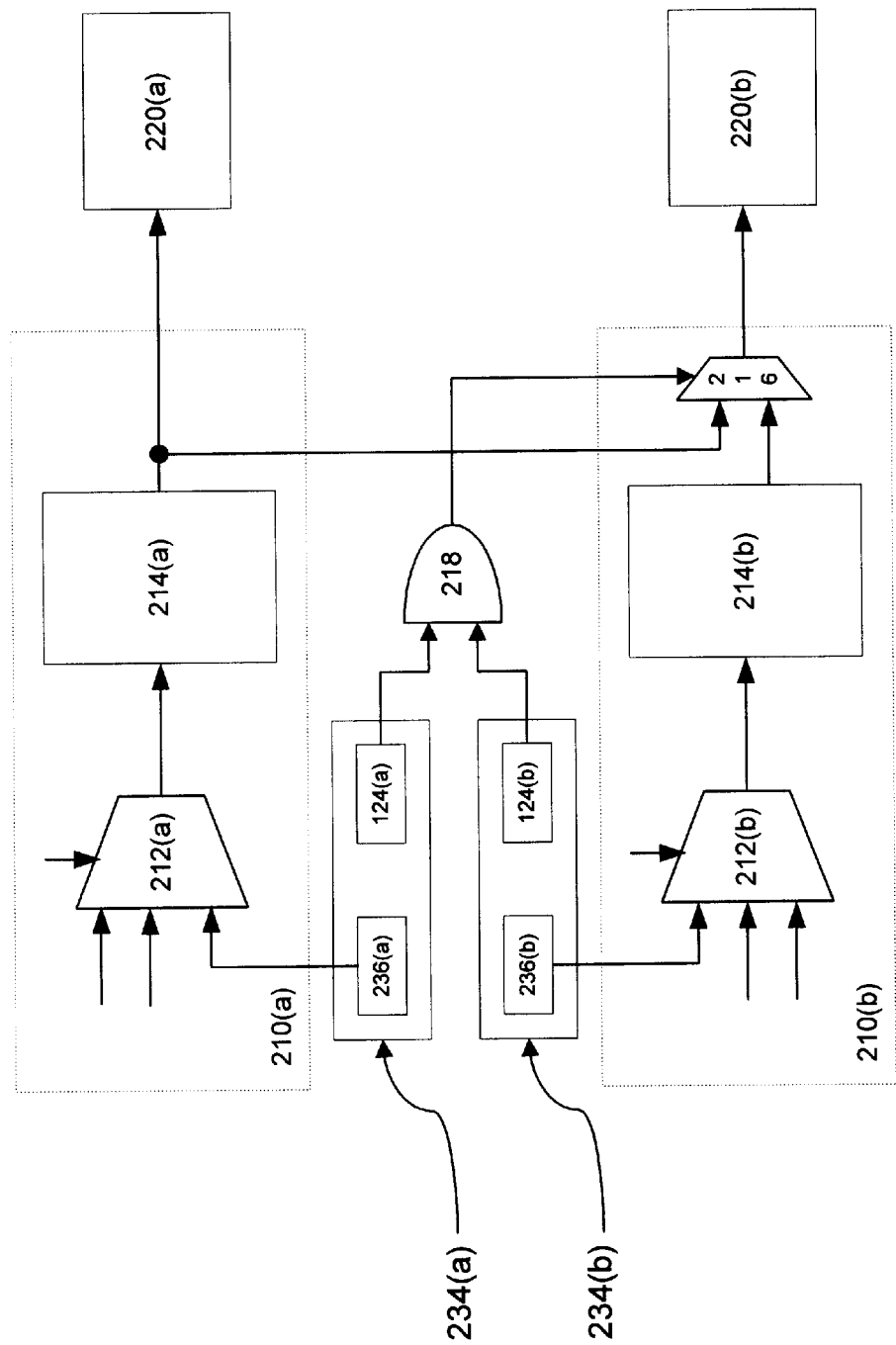
FIG. 2B is a block diagram of one embodiment of the FET stage of the processor in FIG. 2A.

FIG. 2B shows one embodiment of FET stages 210(a), 210(b) suitable for operating execution cores 110 independently, e.g. as SMPs, when processor 100 is in HP mode and in lock step when processor 100 is in HR mode. Each FET stage 210 includes an instruction pointer (IP)-select MUX 212 and an instruction cache 214 that is coupled to DEC stage 220. S/C registers 234 include an IP register 236 that [may be initialized by software to] indicates the next instruction to be executed. In addition, FET stage 210(b) includes a MUX 216 at the output of cache 214(b). MUX 216 is controlled by CSBs 124 through AND gate 218.

MUX 212 receives IPs at its data inputs from various sources, including IP register 236. In response to a signal at its control input, MUX 212 selects one IP to indicate the next instruction to be fetched from cache 214. In HP mode, CSBs 124 are set to zero and MUX 216 transfers the instruction(s) provided by instruction cache 214(b). In this mode, IP registers 236(a) and 236(b) are initialized and updated independently, and caches 214(a) and 214(b) feed corresponding instructions to DEC stages 220(a) and 220(b), respectively. In HR mode, CSBs 124 are set to one under, and MUX 216 provides the instruction from cache 214(a) to DEC stages 220(a), 220(b).

An alternative embodiment of FET stages 210 does not employ MUX 216. Instead, IP registers 236(a), 236(b) and caches 214(a), 214(b) are initialized to the same state for HR mode, and FET stages 210, including caches 214, operate in lock step. Persons skilled in the art of processor design and having the benefit of this disclosure will recognize other variations on FET stages 210 that may be used to implement independent and lock-step instruction fetching for execution cores 110.

Figure 2C:
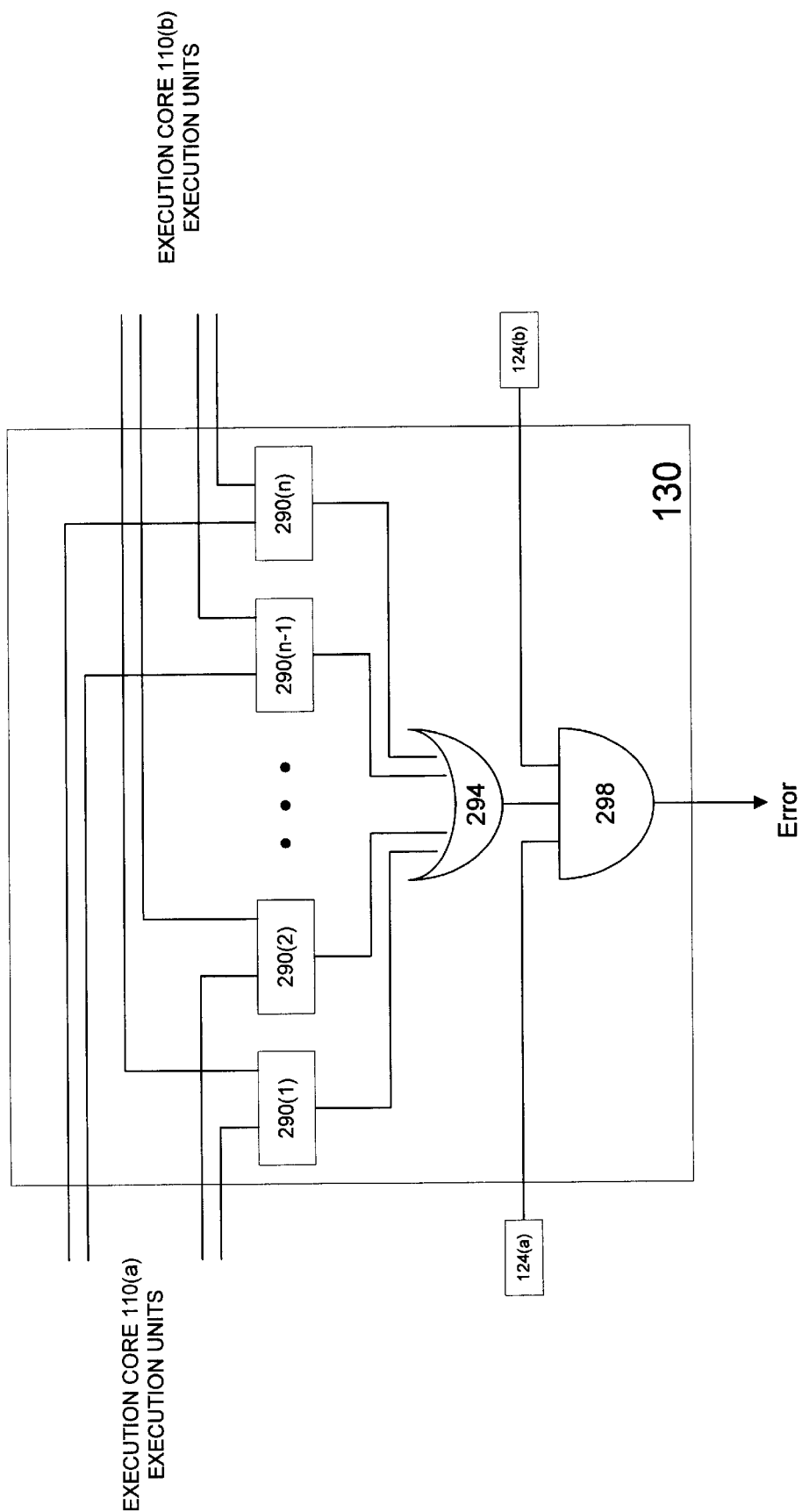
FIG. 2C is a block diagram of one embodiment of the check unit of the processor in FIG. 2A.

FIG. 2C is a block diagram representing one embodiment of check unit 130 in accordance with the present invention. The disclosed embodiment of check unit 130 includes "n" comparators 290(1)–290(n), an OR gate 294, and an AND gate 298. A comparator 290 is provided for each execution unit in an execution core 110. For example, one embodiment of processor 100 may include an integer execution unit (IEU), a floating point execution unit (FPU), a memory execution unit (MEU), and a branch execution unit (BRU) in the EXE stage of each execution core 110. For this embodiment, check unit 130 includes 4 comparators 290. Comparators 290(1), 290(2), 290(3) and 290(4) monitor outputs of the IEUs, FPUs, MEUs, and BRUs, respectively, from execution cores 110(a) and 110(b).

For the disclosed embodiment of check unit 130, each comparator 290 generates a logic value zero when the execution results applied to its inputs match and a logic value one when the execution results do not match. For one embodiment of check unit 160, comparators 290 are self check comparators. OR gate 294 generates a logic value one when any of comparators 290 indicates that its corresponding execution results do not match. The output of OR gate 294 serves as an ERROR signal when AND gate 298 is enabled. For the disclosed embodiment, this occurs when CSBs 124 are both set to one, i.e. when processor 100 is in HR mode.

Persons skilled in the art of processor design and having the benefit of this disclosure will recognize other variations on check unit 130 that may be activated to monitor results in execution cores 110 when processor 100 is in HR mode.

One embodiment of processor 100 switches between HR and HP modes in response to mode switch instructions (or instruction bundles). In the following discussion, S_HR represents one or more instructions that switch processor 100 from HP to HR mode ("HP-to-HR mode switch"), and S_HP represents one or more instructions that switch processor 100 from HR to HP mode ("HR-to-HP mode switch"). Mode switch instructions may be provided to execution cores 110 through applications, the operating system (OS), firmware, interrupt handlers or some combination of these.

For one embodiment of the invention, HR and HP process threads may be identified at compile time and appropriate mode switch instructions may be prepended to the process threads by, for example, a linker. When a process thread is scheduled, its mode switch instruction switches processor 100 to an appropriate execution mode before the thread is executed. If the thread is interrupted, the execution mode information is saved and restored with the rest of the processor state information.

For another embodiment, mode switch instructions may be incorporated into an OS scheduling routine, which is run prior to executing a new process. The OS determines the mode in which the thread is to be executed, and schedules the appropriate mode switch instruction, as needed, ahead of the process. Still another embodiment may employ a firmware routine to switch modes. For example, the routine may be accessed when a process thread to be executed in one execution mode encounters processor 100 in the other execution mode. The firmware routine includes mode switch instructions to implement the mode switch.

Persons skilled in the art of processor design and having the benefit of this disclosure will recognize other mechanisms for scheduling mode switch instructions. The present invention is independent of the particular mechanism through which mode switch instructions are scheduled onto execution cores 110.

For the disclosed embodiment of processor 100, where execution cores 110 operate "independently" in HP mode, an HP-to-HR mode switch may be implemented in stages, by executing S_HR instructions in each execution core 110. Staging the transition accommodates differences in the states of the HP code segments that are in process on execution cores 110(a) and 110(b) when the HR code segment is ready to begin. In the first stage, an S_HR instruction switches one execution core to a "ready state", e.g. CSB(b) 124=1. In the second stage, an S_HR instruction switches the other execution core to a "ready state", e.g. CSB(a)=1. The processor switches to HR mode when both execution cores reach the ready state, e.g. PSB=CSB(a) AND CSB(b). The first and second stages may overlap in whole (simultaneous switch), in part, or not at all (sequential switch), depending on the algorithm used to schedule the process threads.

The ready state allows the execution cores to synchronize before the processor switches from HP to HR mode. For other embodiments of the invention, the first and second phases may be executed sequentially. For example, the first stage may complete and trigger the second stage through a hardware mechanism. For HR to HP transitions, the execution cores operate in lock step prior to the transition. The S_HP instructions are executed simultaneously and the execution cores proceed independently after the transition. There is thus no need for a ready state to synchronize the cores.

Figure 3B:
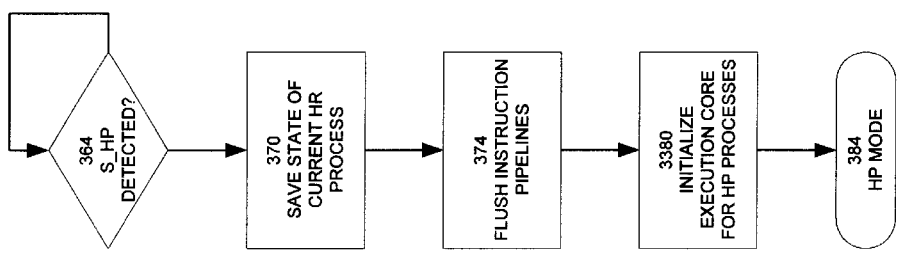
FIG. 3B is a flow chart representing one embodiment of a method implemented by an execution core in response to an HR-to-HP mode switch instruction.
Figure 3A:
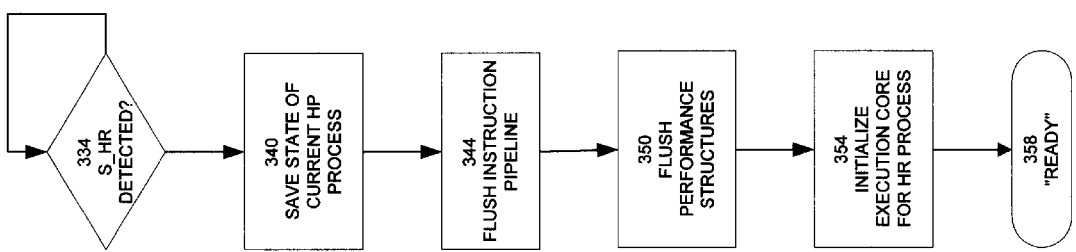
FIG. 3A is a flow chart representing one embodiment of the method implemented by an execution core in response to an HP-to-HR mode switch instruction.

FIG. 3A is a flow chart representing one embodiment of method 330 for switching an execution core to a "ready state". Method 330 represents the operations performed by an execution core in response to an S_HR instruction. When S_HR is encountered 334, the architectural state of the current HP thread is saved 340, and the instruction pipeline is flushed 344 of any remaining instructions. In addition, state data associated with performance speedup structures such as caches, branch target buffers (BTB), the cache portion of a translation look-aside buffer (TLB) and the like are flushed 350. This ensures that execution cores 110 begin the HR process in identical states. The execution core is then initialized 354 for the upcoming HR process. This entails, for example, initializing the S/C registers to values appropriate for the HR process. In particular, the CSB in the CSR is set to one to indicate that the new thread is to be executed in HR mode. The execution core is in its "ready state" 358 when the S/C registers are initialized for the HR thread and the CSB is set to one. In "ready" state, the FET stage may issue NOPs until the other execution core reaches the "ready" state and the processor transitions to HR mode.

Method 330 is repeated for the second execution core to execute its S_HR instruction. For one embodiment of the invention, data may be copied from the registers and caches of the first execution core that is initialized for the pending HR process thread to the registers and caches of the second execution core to reach the ready state.

Software controlled mode switching in accordance with the present invention is illustrated for an HP to HR transition in FIGS. 4A–4E. These figures represent the states of execution cores 110(a) and 110(b) at various times as processor 100 switches from HP and HR modes. The pipeline states represented in FIGS. 4A–4E are independent of the source of the mode switch instructions.

Figure 4C:
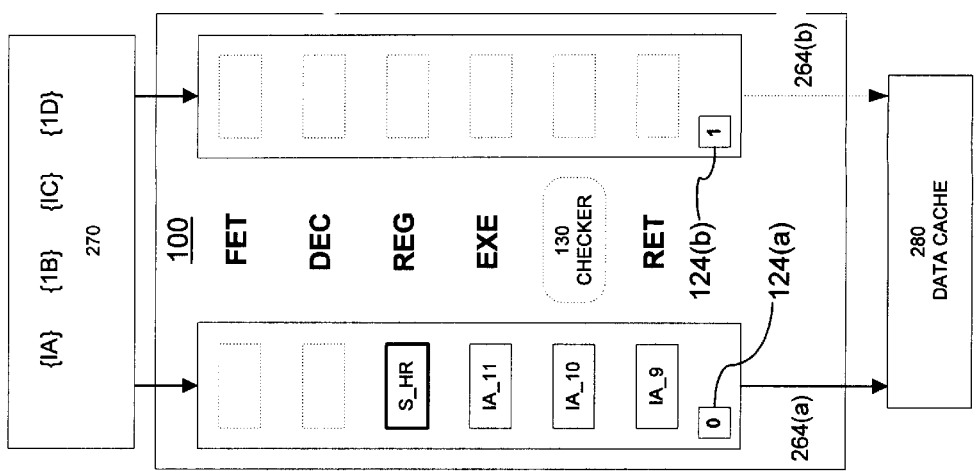
FIGS. 4A–4E[D] represent the processor pipeline of FIG. 2A at various points in a transition from high performance (HP) mode to high reliability (HR) mode.
Figure 4B:
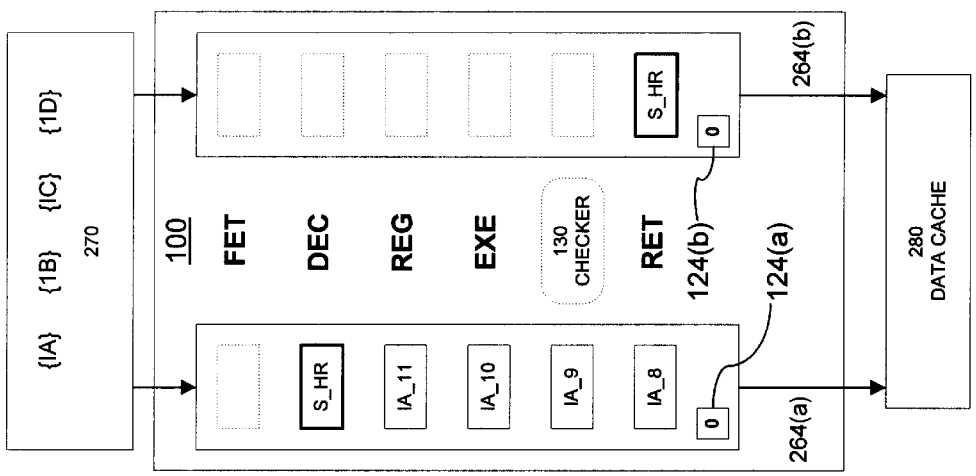
Figure 4A:
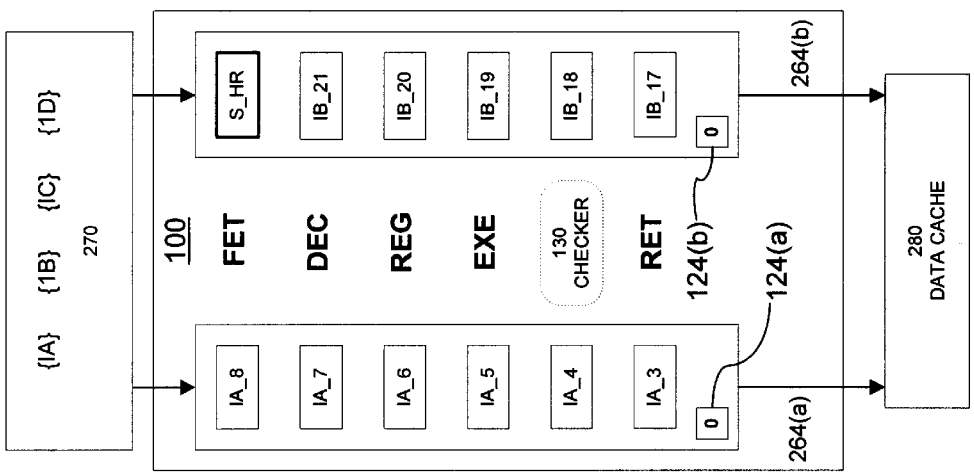

FIG. 4A represents an embodiment of processor 100 that is executing process A {IA} and process B {IB} in execution cores 110(a) and 110(b), respectively. Process C {IC} and process D {ID} are awaiting execution in memory system 270. In this example, processes A, B, and D are to be executed in HP mode ("HP processes"), and thread C is a critical code segment which is to be executed in HR mode ("HR process").

With processes A and B executing in HP mode, CSBs 124 are set to zero, check unit 130 is deactivated (indicated by dashed lines), FET stages 210 are in HP mode, and retirement channels 264 are enabled. IA_n and IB_m represents the $n^{th}$ and $m^{th}$ instruction(s) for thread A and thread B, respectively, and each pipe stage is labeled by the instruction(s) on which it is currently operating. For example, IA_3 and IB_17 are in the RET stages, and IA_5 and IB_19 are in the EXE stages. Similar designations are used for instructions from processes C and D.

In FIG. 4A, S_HR has just been fetched into execution core 110(b), indicating that instructions from a critical code section are about to be executed. Execution core 110(a) is still fetching instructions from thread A for execution in HP mode.

FIG. 4B represents processor 100 at a later time when IA_8 and S_HR have reached the RET stages of execution cores 110(a) and 110(b), respectively, and an S_HR instruction has entered execution core 110(a). The number of clock cycles between S_HR instructions in execution cores 110(a) and 110(b) depends on the scheduling mechanism employed and the state of the currently executing HP processes when the HR thread is ready for execution. For example, IA_9 may involve a relatively long latency I/O operation that provides a natural breaking point in the thread A instruction flow. The instruction flow of thread A may be suspended when IA_9 is detected, and S_HR may be inserted following IA_9. Alternatively, IA_9 may be the last instruction in process A.

Different embodiments of processor 100 may or may not continue to fetch instructions into execution cores 110 following S_HR instructions and prior to the switch to HR mode. Instructions that enter execution core 110(a) after the S_HR instruction but before processor 100 switches to HR mode are flushed when S_HR retires. These instructions are re-executed at a later time. In FIG. 4B, instructions following S_HR instructions are shown with dashed lines to indicate that they will not be retired. For example, these may represent the first instructions of the HR process thread that will be flushed and re-executed once the other execution core is synchronized. Alternatively, FET may inject NOPs into execution core 110(a) until the mode switch is complete.

For the disclosed embodiment, execution cores 110(a) and 110(b) may hold instructions from threads designated for execution in different modes during an HP-to-HR mode switch. This is a consequence of the relative independence of execution cores 110(a) and 110(b) when processor 100 is in HP mode. The mechanism by which processor 100 switches from HP to HR modes handles this overlap and synchronizes execution cores 110(a) and 110(b) to begin the HR thread simultaneously.

FIG. 4C represents processor 100 one or more clock cycles after IA_8 and S_HR are retired in execution cores 110(a) and 110(b), respectively. Execution core 110(b) is flushed, CSB 124(b) is set to one, and retirement channel 264(b) is deactivated. Although not indicated in FIG. 4C, S/C registers 234(b) (other than the CSB), data registers 238(b), and data cache 244(b) are initialized for thread C. Each execution core 110 may be initialized when its reaches the ready state, or both cores may be initialized together after processor 100 is switched to HR mode. IA_9, IA_10, and IA_11 are still executing in HP mode in execution core 110(a).

Figure 4E:
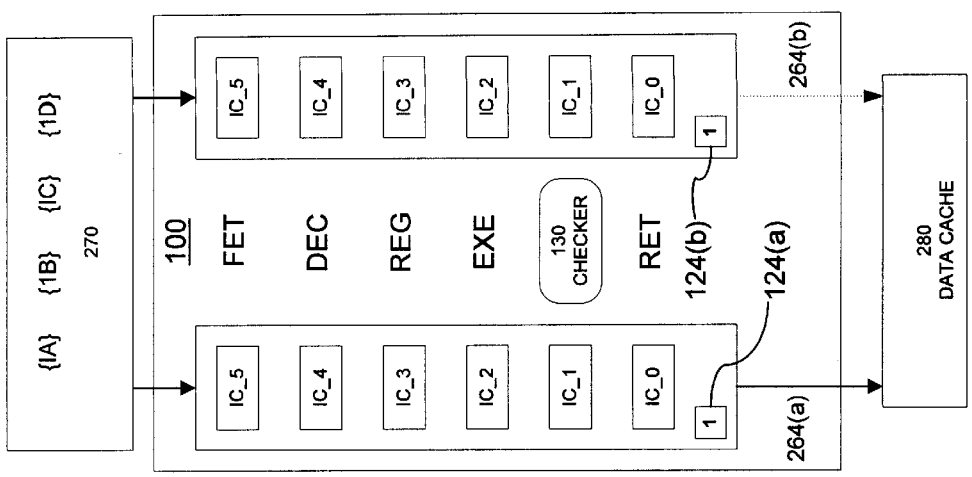
Figure 4D:
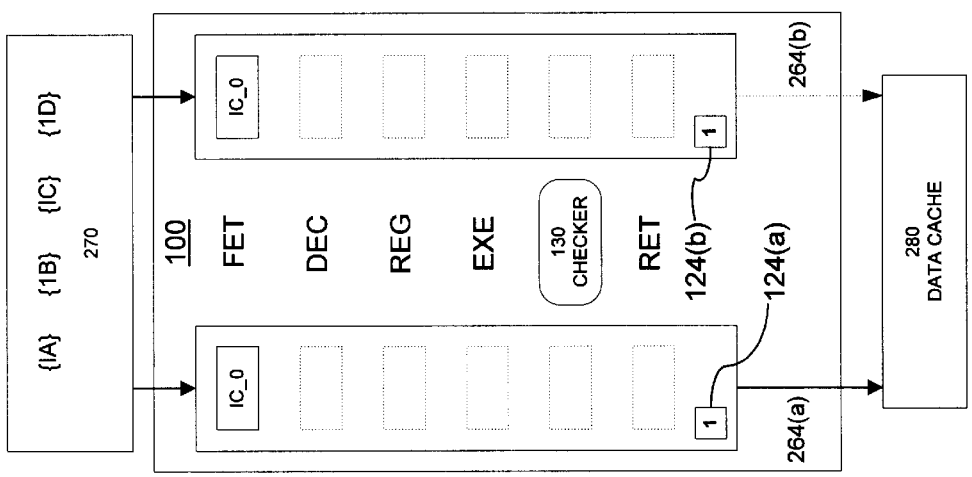

FIG. 4D shows processor 100 several clock cycles later, following retirement of the remaining thread A instructions and S_HR. The stages of execution core 110(a) have been flushed, CSB 124(a) is set to one, and execution cores 110(a) and 110(b) have begun fetching thread C instructions. For the disclosed embodiment of processor 100, setting CSBs 124(a) and 124(b) activates check unit 130 (indicated by solid lines) and enables the FET stages in HR mode. While not indicated explicitly in the figure, the architectural state associated with thread A is saved, and S/C registers 234(a), data registers 238(a), and data cache 244 are initialized for thread C by the mode switch. FIG. 4E shows processor 100 after several clock cycles of operation in HR mode.

No mode transition is necessary between sequential HP process threads. Similarly, no mode transition is necessary between sequential HR process threads. If a mode switch instruction is prepended to a new HP process thread, it may be predicated on or off according to the value of PSB for the currently executing process thread. A similarly arrangement may be applied to sequential HR process threads.

Switching processor from HR mode to HP mode does not raise the same synchronization issues as the HP-to-HR mode switch, because execution cores 110(a) and 110(b) are already operating in lock step before the switch, and they operate independently after the switch.

FIG. 3B is a flow chart representing one embodiment of method 360 for switching processor 100 from HR to HP mode. Method 330 represents the operations performed by an execution core in response to an S_HP instruction. When S_HP is encountered 364, the architectural state of the current HR thread is saved 370, and the instruction pipeline is flushed 374 of any remaining instructions. For the disclosed embodiment of processor 100 in which only execution core 110(a) actually updates the processor architectural state in HR mode, only execution core 110(a) performs update 370. The execution core is then initialized 380 for the HP thread to follow. This entails, for example, initializing the S/C registers to values appropriate for the HP process. In particular, the CSB in the CSR is set to zero. Execution cores 110(a) and 110(b) may implement method 360 in parallel, each initializing its S/C registers to the appropriate state for the HP thread it is to execute.

Figure 5C:
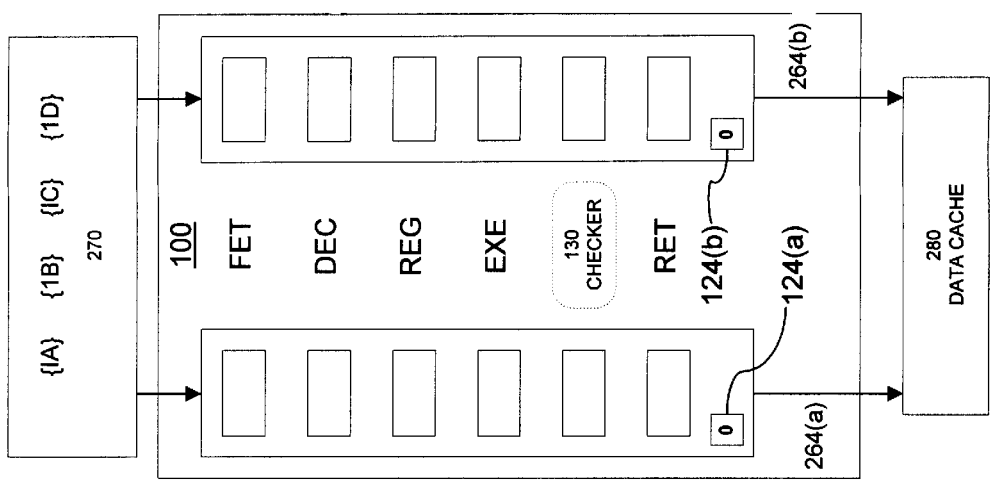
FIGS. 5A–5E[D] represent the processor pipeline of FIG. 2 at various points in a transition from HR mode to HP mode.
Figure 5B:
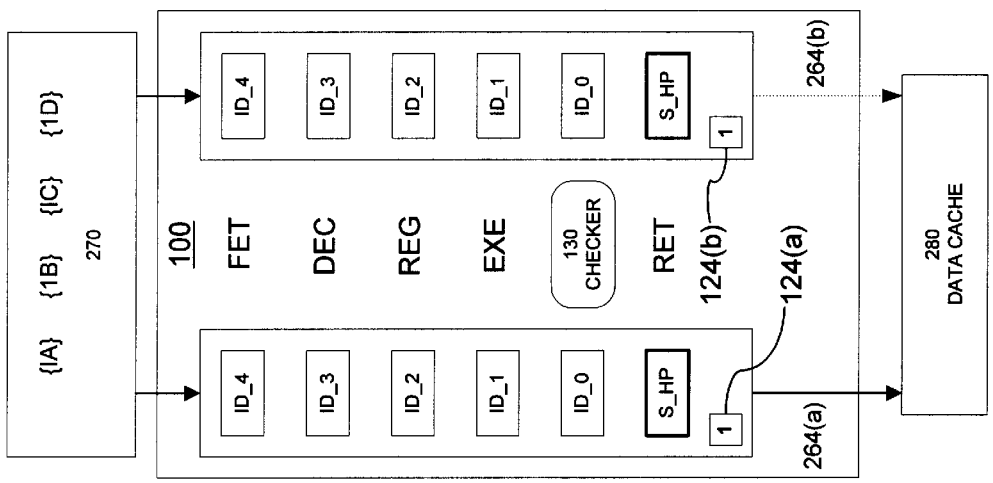
Figure 5A:
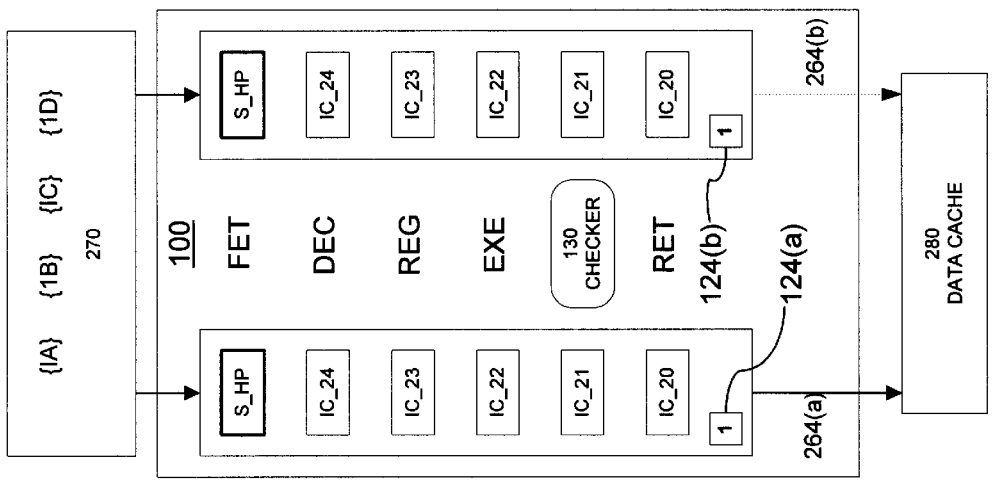

FIGS. 5A through 5D represent processor 100 at various points as it switches from HR mode to HP mode. In FIG. 5A, thread C is executing in HR mode. Accordingly, mode bits 124 are set to one, check unit 130 is activated, retirement channel 264(b) is deactivated, and instructions, IC_n, are being processed in lock step in execution cores 110(a) and 110(b). A mode switch instruction, S_HP, is in the FET stages of execution cores 110(a), 110(b).

In FIG. 5B, the mode switch instructions have reached the RET stages of execution cores 110, and no errors have been detected by check unit 130. In the disclosed example, instructions from a new thread D, which is to be executed in HP mode, are shown entering the stages of execution cores 110, following S_HP. The same instructions enter both execution cores since FET stage 210 remains in HR mode until one of CSBs 124 is set to zero, i.e. when an S_HP instruction retires. Other embodiments of processor 100 may implement different fetching strategies in the interval during which mode switching occurs. As long as execution cores 110 are flushed when S_HP retires, the identity of the instructions is immaterial.

FIG. 5C shows processor 100 following retirement of the S_HP instructions. After processor 100 saves the architectural state associated with thread C, execution cores 110(a), 110(b) are flushed, and CSBs 124 are set to zero. Setting CSBs 124 to zero switches the FET stages to HP mode, deactivates check unit 130, and activates retirement channel 264(b). In addition, processor 100 initializes S/C registers 234, data registers 238, and data caches 244 for the processes they are about to execute.

Figure 5E:
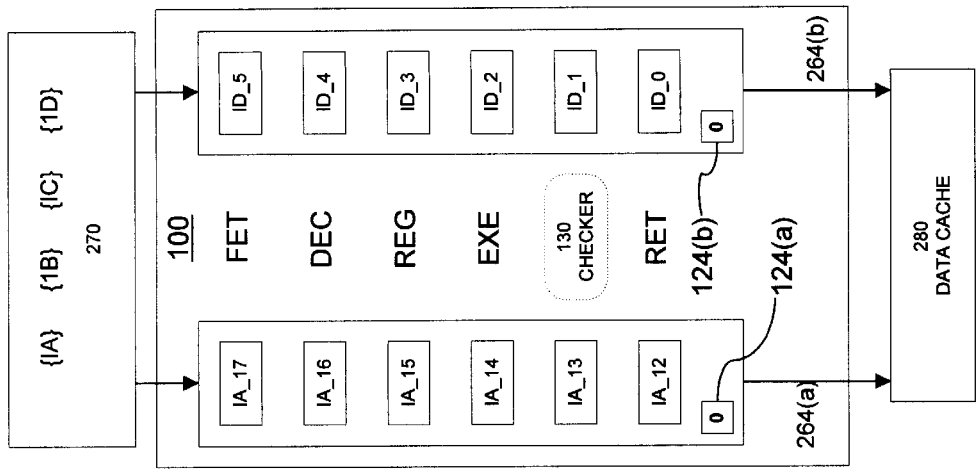
Figure 5D:
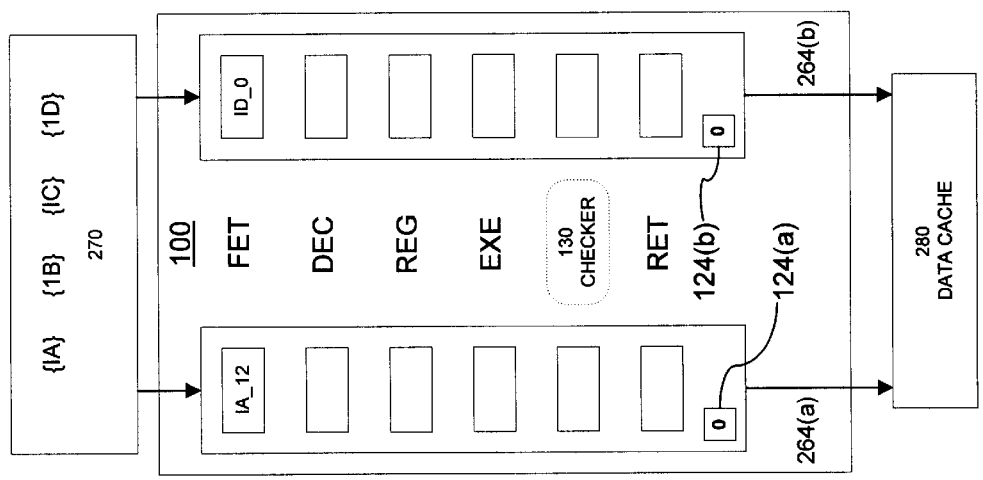

FIG. 5D represents processor 100 one or more clock cycles following the switch to HP mode. Instructions from different processes are being fetched into execution cores 110(a) and 110(b). For example, thread A, which was suspended when the processor 100 switched to HR mode, has been reactivated in execution core 110(a) and a new thread D is being executed in execution core 110(b). If processor 100 completes thread A before its switch to HR mode, a new thread is scheduled for execution core 110(a) when HP mode is resumed. If a suspended thread is restarted, the mode status information may be restored from memory.

FIG. 5E represents processor 100 several clock cycles later, when the instruction pipelines of execution cores 110(a) and 110(b) are filled with instructions from thread A and thread D, respectively.

As indicated in FIGS. 4A–4E and FIGS. 5A–5E, mode switch instructions S_HR and S_HP, respectively, trigger a series of operations in processor 100. S_HR and S_HP may each be implemented as a series of instructions. For example, a cache flush instruction flushes data from caches 244, a serialize instruction flushes execution cores 110, and move instructions or context switch instructions update mode bit(s) 124 and initialize selected S/C and data registers 234 and 238, respectively.

The full benefits of HR mode are realized when the error detecting capability of redundant execution is combined with a mechanism for correcting the detected errors. In HR mode, check unit 130 compares execution results from cores 110 in the DET stage, to determine whether an error has occurred. When no discrepancy is detected, the corresponding instruction(s) are allowed to retire. For one embodiment of the invention, a recovery mechanism is implemented when a discrepancy is detected. The recovery mechanism may be implemented in hardware, software, firmware or some combination of these.

The soft errors targeted by the present invention are unlikely to occur in both execution cores 110 simultaneously. Consequently, differences in execution results detected by check unit 130, in the absence of errors originating in parity/ECC protected arrays, are most likely due to soft errors in the circuitry of execution cores 110. Since these errors occur relatively infrequently, one method for correcting them is to flush execution cores 110 (or portions thereof) and re-execute the flushed instructions, beginning with the instruction that triggered the error.

For one embodiment of the invention, the IP of each instruction may be tracked until it is sucessfully retired. If the instruction triggers an error, each execution core may be resteered to the IP of the triggering instruction. This approach repeats execution of the instruction(s) through the entire pipeline, which may not be efficient. For another embodiment of the invention, only the back end of the instruction execution pipeline may be replayed.

Figure 6:
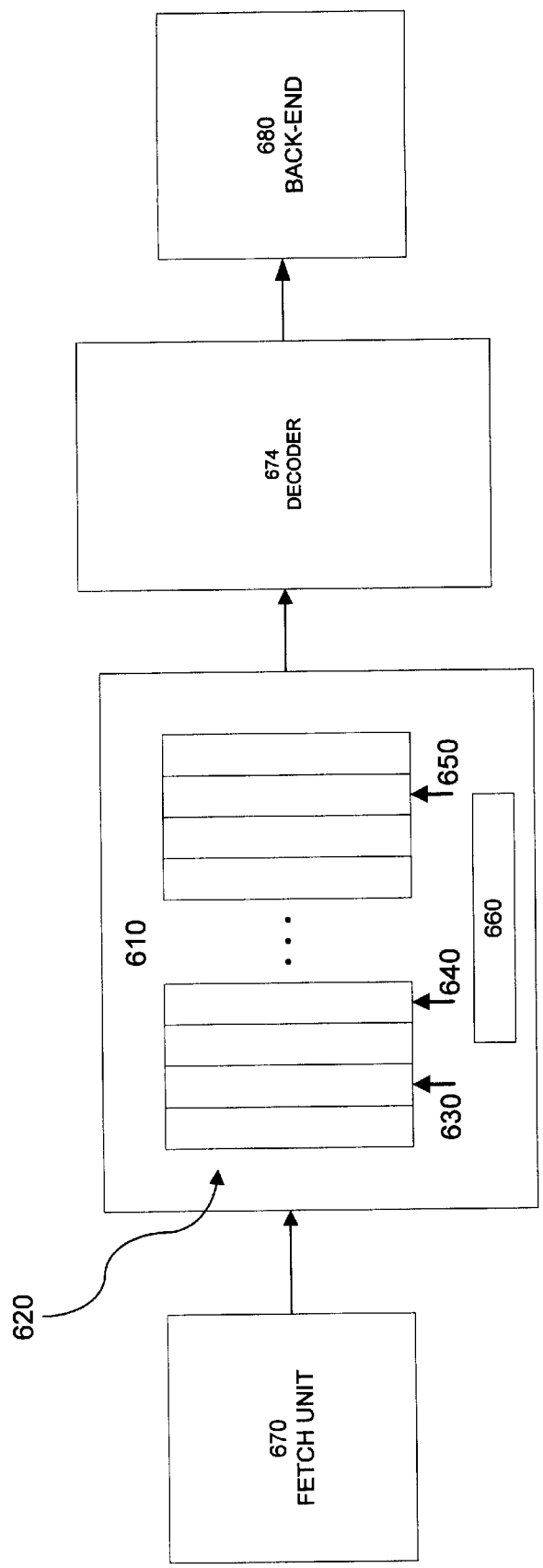
FIG. 6. is a block diagram of one embodiment of a replay queue that may be used to correct errors detected in HR mode.

FIG. 6 is a block diagram of one embodiment of a replay queue 610 and associated logic that may be incorporated in execution cores 110 for error correction. The disclosed embodiment of replay queue 610 includes multiple slots 620 to store fetched instructions, pointers 630, 640, 650 to track the status of the stored instructions, and control logic 660 to manage pointers 630, 640, 650. For the disclosed embodiment, an instruction cache 670 provides an instruction (or instruction bundle) to an available slot 620. The stored instruction(s) is decoded into one or more $\mu$ops by a decoder 674 and issued to a back end 680 of the processor pipeline. Back end 680 may include, for example, circuitry associated with the REG, EXE, DET, and RET stages of execution cores 110.

Control unit 660 updates pointers 630, 640, 650 as new $\mu$ops are transferred to queue 610, issued to back-end 680, and retired, respectively. For other embodiments, the relative location of replay queue 610 and decoder 614 may be reversed, in which case replay queue 610 stores $\mu$ops decoded from fetched instructions. In the following discussion, "instruction" and "$\mu$op" are used interchangeably.

For the disclosed embodiment of processor 100, replay queue 610 may be incorporated in the logic associated with DEC stage (FIG. 2) and back-end 680 includes logic associated with REG, EXE, DET, and RET stages. Pointers 630, 640, 650 are updated as instructions are received from FET stage, transferred to REG stage, and retired in RET stage, respectively. For this embodiment, pointer 630 ("head pointer") indicates the latest instruction(s) to enter queue 610, pointer 640 ("tail pointer") indicates the next instruction(s) to be issued to the REG stage, and pointer 650 indicates the next instruction to be retired ("replay pointer") from RET stage. At a given time, the instructions in the slots that follow tail pointer 630, up to and including the instruction(s) indicated by replay pointer 650, are being executed in back-end 680. Head pointer 630 is updated when a new instruction enters REG stage, tail pointer 640 is updated when a new instruction enters replay queue 610 from instruction cache 670, and replay pointer 650 is updated when the instruction to which it currently points enters RET stage.

When the disclosed embodiment of processor 100 is operating in HR mode, check unit 130 signals an error and flushes the back end pipe stages if it detects discrepancy between the execution results in the DET stages of execution cores 110(a) and 110(b). When control unit 660 detects the error signal, it adjusts tail pointer 630 to indicate the slot currently indicated by replay pointer 650. This effectively reschedules all un-retired instructions that are currently in the back end of the pipeline for (re)issue to the REG stage. For one execution core 110, the instruction(s) indicated by replay pointer 650 is the source of the erroneous execution result, and the instruction(s) in the slots between head pointer 630 and replay pointer 650 follow this error-generating instruction in the back-end of the pipeline. All of these instruction(s) may be flushed from the back end of the pipeline, and reissued by replay queue 610, beginning with the instruction(s) that triggered the error.

Another embodiment of replay queue 610 tracks dependencies between instruction in addition to their status in backend 680. This embodiment of replay queue 610 flushes and replays only the instructions that triggered the error and the issued $\mu$ops that depend on it ("partial replay").

Yet another embodiment of replay queue 610 employs a shift register, which physically shifts instruction(s) down the queue 610 as earlier instruction(s) are retired. In this embodiment, the oldest, unretired instruction(s) is at the end of queue 610, and a separate replay pointer is not needed. As in the above embodiments, head pointer 630 indicates the next instruction to issue to the back end and tail pointer 640 indicates the last instruction to enter queue 610.

Replay mechanisms for addressing soft errors are also discussed in related U.S. patent application Ser. No. 09/469, 961, entitled "Replay Mechanism For Correcting Soft Errors" and filed on even date herewith.

Another mechanism for correcting errors in dual core processor 100 applies parity checks at various points along the instruction pipelines of execution cores 110. The resulting parity-protected execution cores 110 complement parity/ ECC protected caches and storage arrays. A processor with dual, parity-protected execution cores can determine not only when a soft error event occurs, but also which execution core suffered the soft error event and, consequently, which execution core provides an uncorrupted result. The uncorrupted result may then be used to update the processor's architectural state and correct any errors in the execution core that suffered the soft error event.

For the data path and execution logic, soft errors are most likely to occur in elements such as staging latches and registers. These elements store voltage levels that represent operand values or $\mu$ops at various points of the instruction pipeline. A parity bit may be associated with each operand and/or $\mu$op in the instruction pipeline, and checked subsequently against a value derived from the operand or µop, respectively. Alternatively, the parity value for an operand or µop may be checked against the parity bit associated with the corresponding operand or µop in the other execution core. Parities may be checked at various points along the pipeline or, staged along the pipeline with their associated operands or µops and checked all at once in the DET stage.

One advantage of implementing parity protection in conjunction with dual execution cores 110 is that the correct execution result may be determined without need to reexecute the instructions. For example, if check unit 130 detects a discrepancy between the execution results (by comparing their values or their parity bits), it can compare the calculated parities for the results against their corresponding parity bits to determine which result is correct. The execution core 110 providing the correct result may then update the processor's state and make any corrections necessary to the C/S or data registers of the execution core that produced the error.

For yet another embodiment of the invention, check unit 130 may trigger an interrupt that implements an error handling routine in firmware or software. For this embodiment, processor 100 may access an error handling routine when check unit 130 signals an error. One embodiment of a firmware recovery mechanism operates in conjunction with parity protected register files and/or staging latches in execution cores 110. When an error is detected, a firmware routine reads parity bits associated with the registers and/or latches to determine where the error lies. The register files and/or latches of the execution core that produces the error may be updated with data from the execution core that does not display any parity errors. A mechanism for implementing firmware-directed error recovery in a redundant execution system is disclosed in U.S. patent application Ser. No. 09/469,963, entitled "Firmware Mechanism for Correcting Soft Errors" and filed on even data hererwith.

There has thus been disclosed a system and method for dynamically adjusting the operating mode of a processor according to the type of software the processor is executing. A processor in accordance with the current invention includes dual execution cores, which can be operated in lock step fashion in an HR mode and which can be operated independently in an HP mode. The appropriate execution mode is determined by the type of software to be executed. Critical code segments are executed in HR mode, while non-critical code segments are executed in HP mode. Instructions associated with each code segment or with an operating system trigger the processor to switch to the appropriate execution mode when the code segment is ready to execute.

For one embodiment of the invention, the processor is switched from HP to HR mode by executing a mode switch instruction on each execution core. HP-to-HR mode switch instructions initialize their corresponding execution cores and transition them into a ready state from which they are synchronized for lock step operation. HR-to-HP mode switch instructions are executed on the synchronized execution cores to switch the processor back into HP mode.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A processor comprising:
    first and second execution cores to process identical instructions in lock step when in a high reliability mode and to process instructions independently when in a high performance mode, the first and second execution cores being capable of switching between the high reliability and the high performance mode under software control.

2. The processor of claim 1, further comprising a check unit to compare execution results from the first and second execution cores when in the high reliability mode and signal an error when the execution results do not match.

3. The processor of claim 2, wherein the check unit is deactivated when in the high performance mode.

4. The processor of claim 2, further comprising a retirement unit, the retirement unit to retire an execution result from the first execution core when in the high reliability mode and the check unit does not signal an error.

5. The processor of claim 4, wherein the retirement unit retires execution results from the first and second execution cores when in the high performance mode and no exceptions are raised.

6. The processor of claim 1, wherein each of the execution cores enters a ready state when it executes a first mode switch instruction, the mode switch instruction switches the first and second execution cores to high reliability mode when both the first and second execution cores are in the ready state.

7. The processor of claim 1, wherein the first and second execution cores include first and second mode status bits, respectively, to indicate states of the first and second execution cores.

8. The processor of claim 7, wherein the first and second execution cores include first and second fetch stages, respectively, the first and second fetch states operate in a high reliability mode when the first and second mode status bits are in a first logic state.

9. The processor of claim 8, wherein the first fetch stage operates in high performance modes when the first mode status bit is in a second logic state, and the second fetch stage operates in high performance mode when the second mode status bit is in a second logic state.

10. The processor of claim 7, further comprising a check unit, the check unit being activated when the first and second mode status bits are in the first logic state, and the check unit being deactivated when either the first or second mode status bit is in the second logic state.

11. A computer system comprising:
    a memory to store a plurality of instructions, including a mode switch instruction; and
    a processor including first and second execution cores that operate in lock step when the processor is in a first mode and that operate independently when the processor is in a second mode, the processor switching between the first and second processor modes in response to the mode switch instruction.

12. The computer system of claim 11, wherein the processor further comprises a check unit that compares execution results generated by the first and second execution cores when the processor is in the first mode and signals an error if the execution results do not agree.

13. The computer system of claim 12, wherein the check unit is deactivated when the processor is in the second mode.

14. The computer system of claim 11, wherein the first and second execution cores include first and second fetch units, respectively, which fetch the same instruction from the memory when the processor is in the first mode and which fetch instructions from memory independently when the processor is in the second mode.

15. The computer system of claim 11, wherein the plurality of instructions includes instructions from a first code segment to be executed in the first mode and a second code segment to be executed in the second mode.

16. The computer system of claim 11, wherein the mode switch instruction comprises a first mode switch instruction to switch the processor from the first mode to the second mode and a second mode switch instruction to switch the processor from the second mode to the first mode.

17. A method for processing code segments in a dual core processor, the method comprising:
  detecting a first code segment to be executed in high reliability mode;
  executing a first mode switch instruction to place the processor in high reliability mode; and
  executing the first code segment in high reliability mode, including first and second execution cores of the dual core processor processing identical instructions in lock step during the high reliability mode.

18. The method of claim 17, further comprising:
  detecting a code segment to be executed in high performance mode;
  executing a second mode switch instruction to switch the processor to high performance mode; and
  executing the code segment in high performance mode.

19. The method of claim 17, wherein executing a first mode switch instruction comprises:
  executing the first mode switch instruction on each of the dual execution cores to put each of the execution cores into a ready state; and
  switching the processor to high reliability mode when each of the dual execution cores is in the ready state.

20. The method of claim 19, wherein executing the first mode switch instruction on each of the dual execution cores causes each of the dual execution core to:
  save an architectural state for a currently executing code segment;
  flush instructions from the execution core; and
  initialize the execution for the first code segment.

21. A method for changing execution mode in a dual core processor, the method comprising:
  switching a first execution core of the processor to a ready state;
  switching a second execution core of the processor to the ready state;
  switching the processor to a high reliability mode when the first and second execution cores are in the ready state, and
  first and second execution cores of the dual core processor processing identical instructions in lock step during the high reliability mode.

22. The method of claim 21, wherein switching the first execution core comprises:
  detecting a mode switch instruction;
  setting a mode status bit to a first logic state; and
  flushing an instruction pipeline associated with the execution core.

23. The method of claim 21, further comprising:
  detecting a code segment to be processed in the high reliability mode; and
  scheduling first and second mode switch instructions on the first and second execution cores when the processor is not already in the high reliability mode.

24. The method of claim 23, further comprising:
  executing the code segment in the high reliability mode;
  comparing execution results generated by the first and second execution cores; and
  signaling an error when the execution results do not match.

* * * * *

UNITED STATES PATENT AND TRADEMARK OFFICE
CERTIFICATE OF CORRECTION

PATENT NO. : 6,615,366 B1
DATED : September 2, 2003
INVENTOR(S) : Grochowski et al.

It is certified that error appears in the above-identified patent and that said Letters Patent is hereby corrected as shown below:

<u>Title page,</u>
Item [57], ABSTRACT,
Line 8, delete "monde", insert -- mode --.

<u>Column 4,</u>
Line 56, delete "dashed".

Signed and Sealed this

Eleventh Day of May, 2004

JON W. DUDAS
*Acting Director of the United States Patent and Trademark Office*